June 25, 1968     W. C. CLARK     3,389,851
SUNDAE CONTAINER CONSTRUCTION
Filed March 31, 1967
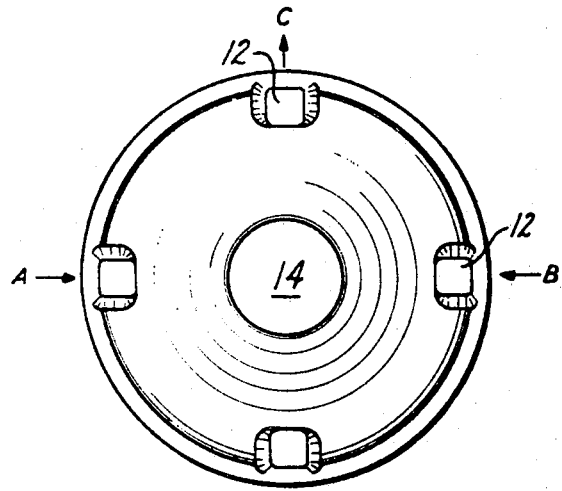
Fig. 1
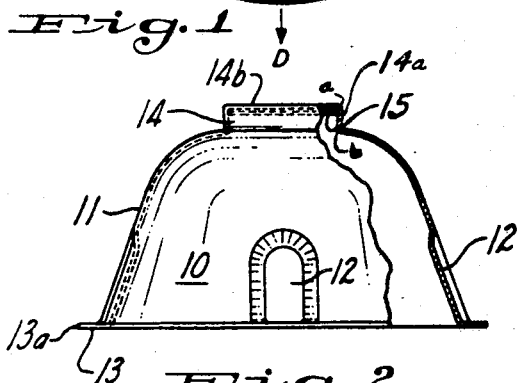
Fig. 2
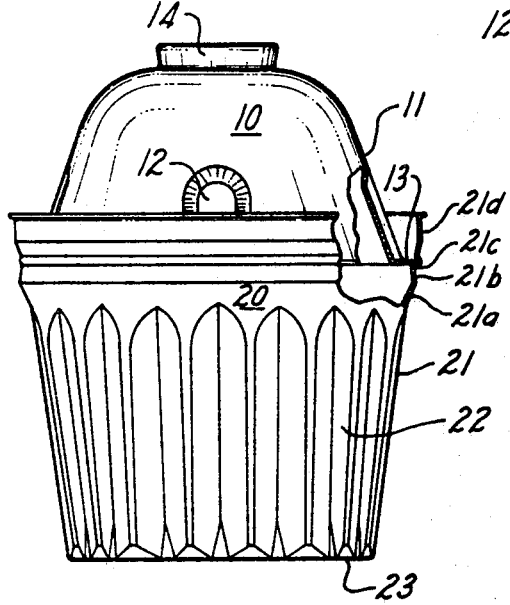
Fig. 3
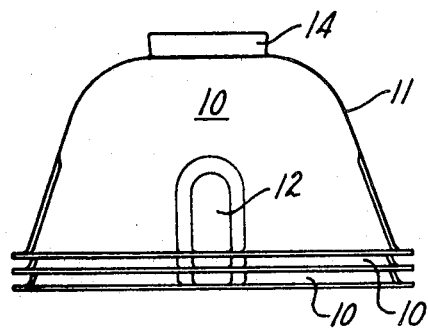
Fig. 5
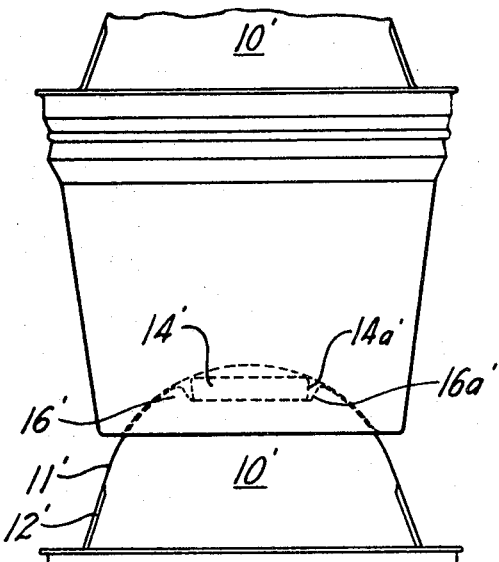
Fig. 4
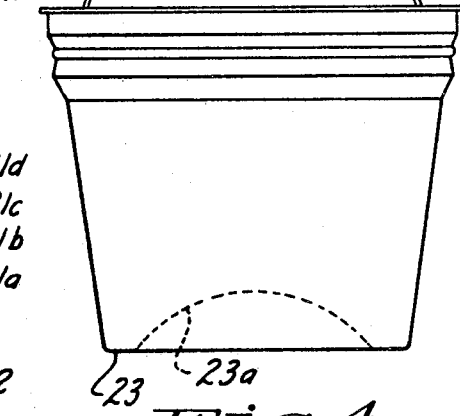
INVENTOR.
WILLIAM C. CLARK
BY
HIS ATTORNEYS

United States Patent Office 3,389,851
Patented June 25, 1968

3,389,851
SUNDAE CONTAINER CONSTRUCTION
William C. Clark, 599 Audubon Ave.,
Pittsburgh, Pa. 15228
Filed Mar. 31, 1967, Ser. No. 627,495
15 Claims. (Cl. 229—43)

ABSTRACT OF THE DISCLOSURE

A dome-shaped translucent closure lid is constructed to removably snap-fit and latch-engage within an open end of and to rest upon an inside seat of a bottom container for a food product, such as ice cream, to provide an upwardly-offset container compartment and viewing enclosure for topping of a food product that is carried in the bottom container. The closure lid is provided with a rounded, dome or conically-shaped body surmounted at its apex by a reinforcing and stabilizing top button-like portion, with an annular radially-outwardly projecting bottom mounting flange, and with offset or recessed finger grip portions in a spaced quadrant relation about its rounded body.

---

This invention relates to an improved closure lid for a container such as used for a food product having a topping thereon and particularly, to an inexpensive and practical container assembly that will attractively display a food product therein, and will provide for and protect a desired consumable relation, association or shape of portions of the food product for transportation, storage and display thereof.

A phase of the invention deals with a protective display lid, that is constructed to provide additional enclosed compartment space for the topping of a food product, that is securely retained in position with respect to and within a cooperating lower container part, and that can be easily removed by gripping it along one axis and flexing it at an axis substantially at right angles thereto and without damage to the topping arrangement.

There has been a need in the art for a container assembly that is suitable for carrying, storing and displaying a food product that has a topping thereon, such as a small cake having a topping of icing, a pudding with a topping of whipped cream, and such as ice cream with a topping of sauce, fruit, nuts, etc., thereon in the nature of a sundae. The container assembly should be of a type that will securely maintain its contents in a protected relationship until the product is sold and is to be consumed and, at the same time, should enable the purchaser to readily remove its lid without damage to the arrangement or assembly of the food product and to enable him, if he desires, to consume the product as supported within the bottom container part of the assembly. The assembly should permit stacking of assembled containers and of lids without tight nesting, such that no difficulty will be encountered in separating them, and should be constructed to pleasingly display the food product and particularly, its topping when displayed by a merchant for purchase. In addition, the purchaser should be able to remove the top or lid part of the container assembly without spoiling the assembly and detracting from its appearance effect. The invention thus deals with an improved container assembly which meets the various factors involved and which is so inexpensive that it can be supplied as a disposable item with the food product.

It has thus been an object of the invention to devise a practical solution to the problem of a container lid for a topped food product which will meet all the factors involved and, at the same time, provide a pleasing appearance to prospective customers, not only from its own standpoint, but also from the standpoint of attracting the customer to the food product protected and contained therein.

Another object of the invention has been to devise an upper container part or lid which will provide an extension of the bottom container compartment and which will have a secure, stable, mounted relation with respect to or within the bottom part and, at the same time, will be easily removable therefrom without damage to the topping of the food product.

Another object of the invention has been to provide a storage, transportation and display container assembly that has a top part that is at least translucent, and is preferably transparent, and will be flexibly-securely retained with respect to the bottom container part until the food product therein is to be consumed.

A further object of the invention has been to devise an improved dome or hat-shaped container lid part which will have a shape-retention rigidity when in position with respect to the bottom container part and which, at the same time, may be removed by manually flexing it.

A still further object of the invention has been to provide a dome or hat-shaped container lid for a food product which will have sufficient strength to normally stay in place with respect to a bottom container part, which may be removed by a deliberate flexing action, and which has a stabilizing and reinforcing button-like portion that may be additionally employed for advertising purposes.

These and other objects of the invention will appear to those skilled in the art from the illustrated embodiments and the claims.

In the drawings, FIGURE 1 is a top plan view of a container lid part constructed in accordance with the invention and on an actual prototype scale;

FIGURE 2 is a side view in elevation of the lid part of FIGURE 1, partially broken away to illustrate details of its construction; this figure is on the same scale as FIGURE 1;

FIGURE 3 is a side view in elevation of a container assembly employing the invention on the same scale as FIGURES 1 and 2, partially broken away to illustrate the fitted or latched relation between the upper and lower container parts when they are securely assembled to house a food product;

FIGURE 4 is a view on the same scale as FIGURES 1 to 3, illustrating how container assemblies of the invention may be stacked for storage and display purposes without attaining a tight nested relation that would give rise to difficulty in separating or removing one container with respect to another; and FIGURE 5 is a vertical view in elevation on the scale of FIGURES 1 to 4, illustrating how separate lid parts of the container assembly may be stacked with respect to each other in a loose nested relation.

Referring particularly to FIGURES 1, 2 and 3, a top container part or lid 10 of dome or hat-shape, is provided having a rounded, cone-shaped body 11 which diverges downwardly and converges upwardly. The body 11 has integrally-formed thereon a bottom flange or rim 13 of annular shape that projects radially-outwardly therefrom to define annular, peripheral, endwise-extending edge 13a thereabout. The flange or rim 13, as particularly shown in FIGURES 2 and 3, is shown of horizontally planar or of flat shape, such that its peripheral edge 13a is substantially at right angles to the body portion 11, and such that radial-inward force applied to the edge 13a tends to uniformly flex the body 11 inwardly. See the latched or secure mounted relation disclosed in the broken-out section of FIGURE 3 of the drawings.

The body portion 11 at its top or apex has an integral button-like surmounting portion 14 that reinforces, stabilizes and strengthens it and provides its body portion 11 with latching or securing rigidity when the flange 13 is snapped into a latching position within a lower container part 20. It will be noted that the button-like top portion 14 has a substantially cylindrical vertical wall 14a that slopes inwardly into the body portion 11 in such a manner that one lid 10 may be loosely nested over another lid of the same construction without attaining a tight interfit between their portions 14, see FIGURES 2 and 5. When one lid 10 is nested within another, top peripheral edge a of its wall 14a engages against bottom peripheral edge b of the wall 14a of the other lid 10 to prevent the button portion 14 of the one lid from sliding within the button portion 14 of the other lid.

The vertical wall 14a which converges inwardly or downwardly into the body portion 11 is shown terminating at its upper end in a flat, planar or horizontal top wall 14b whose outer surface may, itself, serve to receive advertising or trademark marking therein or thereon, or which on its inner face may receive a decal or adhesively-applied advertising or trade designating piece of material 15 therein. The button-like top portion 14 is highly important in giving strength and rigidity to the upper portion of the body 11 while, at the same time, allowing the lower portion thereof to flex through the agency of force applied to the peripheral edge 13a of the bottom flange or rim 13.

As shown particularly in FIGURES 1 and 2, the body 11 is provided with a group of peripherally spaced-apart offsets, pressure gripping indentation or recessed portions 12 thereabout that serve to assure a proper manual insertion and removal of the lid 10 with respect to a bottom container part 20. The recessed portions 12 are elongated vertically along the body 11, have a quadrant spaced relation with each other, and extend from adjacent the flange 13; they further strengthen the body 11 of relatively thin wall construction and provide finger grip and pressure areas for flexing the body. Inward-radial force applied along the axis A–B of FIGURE 1 of one pair of opposed portions 12 will tend to flex or distort the body 11 longitudinally along the axis C–D of a second pair of opposed portions 12, such that the lid can be easily removed from its latched or secured realtionship of FIGURE 3.

With particular reference to FIGURE 3, bottom container part 20 is shown provided with vertical flutes 22 along its downwardly-converging, somewhat cylindrical body 21 and, as shown in FIGURE 4, with a bottom closure wall 23 that has a concave, central contoured portion 23a to loosely-receive in a complementary manner a lid part 10 of a second container when, for example, a group of containers are to be stacked.

In FIGURE 4, a slightly modified lid 10′ is illustrated which is of the same construction as FIGURES 1 to 3, inclusive, except that it has an annular shoulder portion 16′ of upwardly-convex contour and annular shape that is connected to the vertical wall 14a′ of the top button portion 14′ by an annular valley or groove 16a′. The same reference numerals are used for similar portions of the modified construction, but prime affixes have been applied thereto. This construction facilitates a ball and socket-like type of vertical stacking of container assemblies with respect to each other. It will be noted that the upper face of the annular shoulder portion 16′ lies along a circular radius that is substantially tangential to the upper peripheral edge of the button portion 14′, or along a curve that intersects opposite portions of the edge a of the button portion 14. The shoulder 16′ has, as shown, a slight downwardly-spaced relation with respect to the button portion 14′ along a curve intersecting opposite edge portions of its top wall 14b.

Again referring to FIGURE 3, vertical wall 21 of the bottom container part 20 has an upper portion 21a which slightly slopes or diverges outwardly and which is connected to a substantially vertical portion 21b adjacent the open mouth. A radially-outwardly offset shoulder 21c is positioned between the portion 21b and a vertical mouth-defining portion 21d to serve as a seat for receiving the flange 13 of the lid part 10. It will be noted that the portion 21c, about its inner extent, provides a recessed latching seat or shelf for the flange 13 and its peripheral edge 13a. The edge 13a of the lid part 13 has a slightly larger diameter than the inner diameter of the recessed or grooved portion of the seat defined by the portion 21c, such that there will be a secure, latching type of snap-in engagement when the two parts are assembled with respect to each other. This engagement can only be released by, as previously pointed out, flexing the lid 10 along an axis, such as represented by A–B or C–D of FIGURE 1, to distort or elongate its flexible body 11 along an axis substantially at right angles thereto, such as represented by the axis C–D or A–B.

Both the parts 10 and 20 may be made of a suitable resin or plastic, such as a vinyl compound. In this connection a polyvinyl resin has been found to be fully satisfactory. However, it is important to provide the lid part 10 with a surmounting button portion 14 and other features to give it the necessary operating characteristics. Both the lid or upper container part 10 and the support, main or lower container part 20 may be of a pressure-formed resin construction. The lid part 10 is preferably fully clear or transparent but may be translucent. The bottom part 20 may be also fully clear, but is preferably translucent so as to emphasize the topping of the food product which is displayed thereabove within the compartment of the lid part 10. The bottom part 20 although preferably also made of a plastic resin material, such as polyvinyl resin, can be made of any suitable material such as pressed cardboard, thin metal or of a clad or sandwiched cardboard construction, since the snap-in locking action of the lid 10 is primarily dependent on its own construction.

Although for the purpose of illustration, embodiments of the invention have been described and shown, it will be apparent to those skilled in the art that various modifications and adaptations may be made without departing from the spirit and scope of the invention as indicated by the appended claims.

I claim:

1. An improved lid for an open-mouth food container which comprises, a dome-shaped flexible body of resin material that diverges downwardly to terminate in an open mouth portion, a peripheral flange extending radially-outwardly from said body adjacent said open mouth portion for seating within the open-mouth of the food container, said body converging upwardly and terminating in a top button portion, said button portion surmounting said body to reinforce and stabilize it, and at least a pair of oppositely-positioned pressure-grip portions on said body adjacent said flange for flexing said body inwardly therebetween.

2. An improved lid as defined in claim 1 wherein said button portion has a substantially planar top wall and a substantially cylindrical side wall connected to said body.

3. An improved lid as defined in claim 2 wherein said side wall slopes inwardly from said top wall into said body whereby a group of said lids may be loosely nested within each other.

4. An improved lid as defined in claim 1 wherein said pressure grip portions are recessed portions elongated vertically along said body to strengthen it.

5. An improved lid as defined in claim 4 wherein two pairs of oppositely-positioned pressure grip portions are provided on said body in a quadrant-spaced relation thereabout, whereby opposed inward pressing force applied to one of said pairs will flexibly elongate said body on an axis extending in the direction of the other of said pairs.

6. An improved lid as defined in claim 1 wherein, said body is of translucent resin material, so that a food product may be viewed externally therethrough, and said flange is substantially horizontally-planar and terminates in an outer annular peripheral edge.

7. An improved lid as defined in claim 1 wherein an annular shoulder projects upwardly from said body in an adjacent and spaced relation with respect to said button portion and has an outwardly-convex surface that lies along a circular radius that is substantially tangential to the upper peripheral edge of said button portion.

8. In an improved container assembly, a bottom container part having bottom and side walls defining a food compartment therein and an upwardly-open mouth portion, said upwardly-open mouth portion having a recessed seating portion therein in a downwardly-spaced relation with respect to an upper edge thereof, an upper closure lid part having a flexible resin body of rounded shape that diverges downwardly to define an open mouth portion and an open compartment that is complementary with the food compartment of said bottom container part, said body having a peripheral flange projecting substantially at right angles outwardly therefrom at its open-mouth portion to snap-engage in a latching relation within said recessed seating portion of said bottom container part, said body being surmounted at its upper end by an end closure portion of button-like shape that is adapted to stabilize and reinforce it, and means on said body for flexing it inwardly from opposite sides thereof to elongate it at substantial right angles thereto for releasing said flange from its latching relation within said recesed seating portion of said bottom container part.

9. In a container for a food product having a topping thereon which container has a lower upwardly-open container part provided with an upwardly-open mouth portion and has an upper closure lid part provided with a downwardly-open mouth portion wherein: the lower container part has a recessed seating portion in a downwardly-spaced relation therein adjacent its open-mouth portion, the upper closure lid part has a rounded transparent body of relatively thin-wall flexible resin material of substantially dome shape, said body has an outwardly-projecting peripheral flange about its open mouth portion adapted to securely latch-engage within said recessed seating portion of the lower container part and has an upwardly-projecting reinforcing and stabilizing top surmounting portion to impart strength and rigidity to the upper portion of said body, and said body has means for flexing it inwardly about said surmounting portion to elongate said flange along one axis and release it from latching engagement within said recessed seating portion of the lower container part.

10. A container as defined in claim 9 wherein said surmounting portion has a substantially planar top closure wall and a substantially cylindrical side wall connected to said body.

11. A container as defined in claim 10 wherein said substantially cylindrical side wall has a downward convergence into said body, whereby at least a pair of said closure lid parts may be loosely nested with respect to each other.

12. A container as defined in claim 10 wherein vertically-elongated recessed portions are positioned in said body and extend upwardly adjacent to said flange to provide finger grip and pressure areas for flexing said body to release the closure lid part from its latching engagement within and for lifting it away from the bottom container part.

13. A container as defined in claim 12 wherein said recessed portions have a spaced quadrant relation thereabout, so that a pair of opposed recessed portions may be manually moved inwardly towards each other to flex said body along an axis extending between a second opposed pair of said recessed portions.

14. A container as defined in claim 10 wherein, said body has an upwardly-convex annular shoulder thereon about said button portion and in a downwardly spaced relation along a curve intersecting opposite edges of said button portion, and said annular shoulder has a spaced-apart relation with respect to said button portion on said body.

15. A container as defined in claim 14 wherein the lower container part has a centrally-concave bottom wall of a curvature substantially corresponding to the intersecting curve, whereby a lower container part may be stacked with its bottom wall positioned over said button portion and annular shoulder of a closure lid part.

References Cited
UNITED STATES PATENTS

| | | | |
|---|---|---|---|
| 2,706,065 | 4/1955 | Stone | 220—60 |
| 2,739,751 | 3/1956 | Bailey | 229—43 |
| 3,292,811 | 12/1966 | Lynch | 220—4 |
| 3,341,048 | 9/1967 | Carbone | 150—.5 |

DAVID M. BOCKENEK, *Primary Examiner.*